(12) United States Patent
Kawai

(10) Patent No.: US 8,407,732 B2
(45) Date of Patent: Mar. 26, 2013

(54) ELECTRONIC EQUIPMENT CONTROL SYSTEM

(75) Inventor: Masanori Kawai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 721 days.

(21) Appl. No.: 11/785,239

(22) Filed: Apr. 16, 2007

(65) Prior Publication Data

US 2007/0245368 A1    Oct. 18, 2007

(30) Foreign Application Priority Data

Apr. 17, 2006   (JP) .................................. 2006-113611

(51) Int. Cl.
*H04N 7/16* (2011.01)
(52) U.S. Cl. ................. 725/27; 725/28; 725/29
(58) Field of Classification Search .............. 725/9–21, 725/25–31
See application file for complete search history.

(56) References Cited

U.S. PATENT DOCUMENTS

| 2002/0144282 A1 | 10/2002 | Van Ee |
| 2003/0061077 A1 | 3/2003 | Sagar |
| 2004/0060059 A1* | 3/2004 | Cohen ............................. 725/30 |
| 2004/0117829 A1 | 6/2004 | Karaoguz et al. |
| 2004/0128680 A1 | 7/2004 | Karaoguz et al. |
| 2004/0205815 A1* | 10/2004 | Hwang ............................ 725/46 |
| 2005/0155052 A1* | 7/2005 | Ostrowska et al. ............. 725/25 |
| 2006/0075015 A1 | 4/2006 | Wu et al. |
| 2007/0180463 A1* | 8/2007 | Jarman ............................ 725/28 |

FOREIGN PATENT DOCUMENTS

| JP | 2001-103406 A | 4/2001 |
| JP | 2003-9028 A | 1/2003 |
| JP | 2004-312505 A | 11/2004 |
| JP | 2005-295357 A | 10/2005 |
| WO | WO 03/092272 A1 | 11/2003 |

OTHER PUBLICATIONS

European Search Report dated Jul. 30, 2007 (Seven (7) pages).
Japanese Office Action dated Aug. 2, 2011, with English translation (four (4) pages).

* cited by examiner

*Primary Examiner* — Bennett Ingvoldstad
(74) *Attorney, Agent, or Firm* — Crowell & Moring LLP

(57) ABSTRACT

An electronic equipment control system including a plurality of pieces of electric equipments connected with one another through a network. A piece of electric equipment among the plurality of pieces of electric equipments comprises: a setting and inputting unit to set and input broadcast content setting information regarding view of a broadcast content; a broadcast content setting information storage unit to store the content setting information; a transmission unit to transmit the content setting information set and input by the setting and inputting unit to another piece of electric equipment connected to the network; a reception unit to receive the content setting information transmitted from another piece of electric equipment connected to the network; and an update unit to update the content setting information stored in the content setting information storage unit based on the content setting information received by the reception unit.

5 Claims, 11 Drawing Sheets

*FIG.3*

| VIEW DATE | VIEW START TIME | VIEW END TIME | CHANNEL | TITLE | GENRE | RATING |
|---|---|---|---|---|---|---|
| 2006/3/5 | 8:00 | 8:30 | 001 | AAA | NEWS | TV-G |
| 2006/3/5 | 22:00 | 23:00 | 101 | BBB | DRAMA | TV-MA |
| 2006/3/6 | 8:00 | 8:30 | 001 | CCC | NEWS | TV-G |
| 2006/3/7 | 20:00 | 20:30 | 151 | DDD | SPORT | TV-G |
| 2006/3/7 | 21:00 | 23:00 | 112 | EEE | MOVIE | TV-14 |

FIG.4

<CONTENT VIEW HISTORY FROM MARCH 5 TO MARCH 7>

| VIEW DATE | VIEW START TIME | VIEW END TIME | CHANNEL | TITLE | GENRE | RATING | EQUIPMENT ID |
|---|---|---|---|---|---|---|---|
| 2006/3/5 | 8:00 | 8:30 | 001 | AAA | NEWS | TV-G | 01 |
| 2006/3/5 | 13:00 | 14:00 | 301 | FFF | DRAMA | TV-G | 03 |
| 2006/3/5 | 22:00 | 23:00 | 101 | BBB | DRAMA | TV-MA | 01 |
| 2006/3/6 | 8:00 | 8:30 | 001 | CCC | NEWS | TV-G | 01 |
| 2006/3/6 | 23:00 | 25:00 | 112 | GGG | MOVIE | TV-PG | 02 |
| 2006/3/7 | 20:00 | 20:30 | 151 | DDD | SPORT | TV-G | 01 |
| 2006/3/7 | 21:00 | 23:00 | 112 | EEE | MOVIE | TV-14 | 01 |
| 2006/3/7 | 23:30 | 24:00 | 411 | HHH | NEWS | TV-G | 02 |

ADVANCE TO CONTENT SETTING AND INPUTTING SCREEN

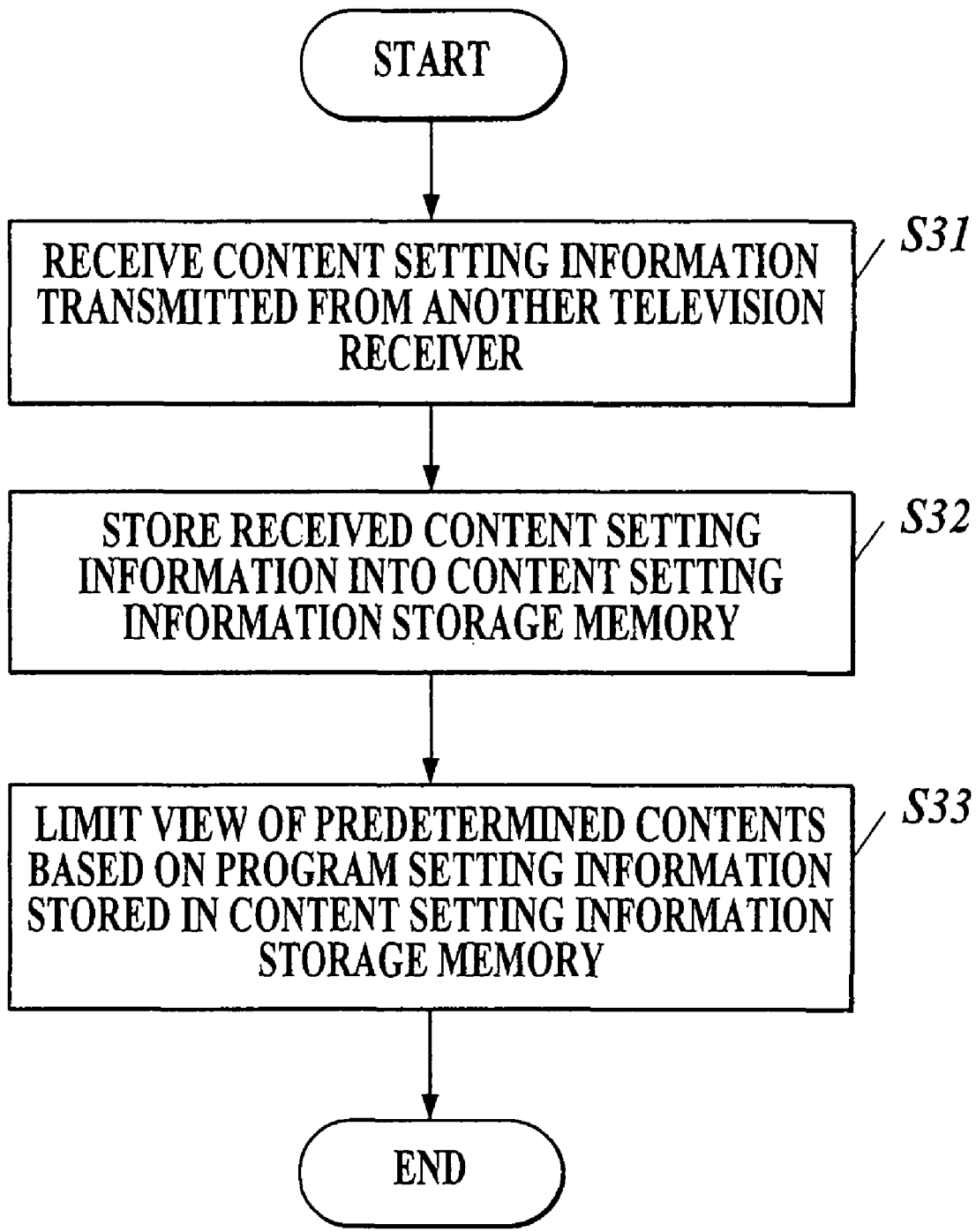

ELECTRONIC EQUIPMENT CONTROL SYSTEM

BACKGROUND OF THE INVENTION

1. Field of the Invention

The present invention relates to an electronic equipment control system including a plurality of pieces of electric equipment through a network.

2. Related Art

Various techniques for effectively utilizing broadcast content setting information such as broadcast content view history and broadcast content view limitation information have conventionally been proposed in connection with electric equipment such as a television receiver.

For example, JP-A 2005-295357 discloses a broadcast reception apparatus in which a certain broadcast reception apparatus can utilize the view history information stored in another broadcast reception apparatus. In the broadcast reception apparatus, a portable broadcast reception apparatus stores the view history information of broadcast contents into the memory thereof, and reads the view history information from the memory to transmit the read view history information with an infrared ray when a predetermined key is operated. Then, a fixed type broadcast reception apparatus receives the view history information transmitted from the portable broadcast reception apparatus to save the received view history information into the memory thereof.

Moreover, for example, JP-A 2003-9028 discloses a view history confirmation apparatus of view limitation information-attached television broadcast contents which view history confirmation apparatus can confirm the view history of the television broadcast contents of the objects of view limitation. Furthermore, JP-A 2005-524293 discloses a method of setting all the channels in a television channel view list for enabling to economize the time before editing a channel list.

However, by the techniques disclosed in these prior art documents, certain electric equipment can utilize the broadcast content view history in other electric equipment in a system including a plurality of pieces of electric equipment connected to one another, or electric equipment can set broadcast content setting information such as view limitation information therein, but by the techniques, the electronic equipment cannot set the broadcast content setting information of the other electric equipment therein.

SUMMARY OF THE INVENTION

It is an object of the present invention to provide an electronic equipment control system capable of simplifying the setting of the broadcast content setting information to each piece of electric equipment among a plurality of pieces of electric equipment connected to a network.

In order solve the above problem, in accordance with a first aspect of the invention, the electronic equipment control system includes a plurality of pieces of electric equipments connected with one another through a network, a specific electric equipment among the plurality of pieces of electric equipments controlling other pieces of electric equipments other than the specific electric equipment, wherein each of the other pieces of electric equipments comprises:

a broadcast content setting information storage unit to store broadcast content setting information including view limitation information to limit view of a predetermined broadcast content;

a broadcast content view history information storage unit to store broadcast content view history information; and a first transmission unit to transmit the broadcast content view history information stored in the broadcast content view history information storage unit to the specific electric equipment through the network, and the specific electric equipment is a portable terminal, and comprises:

a first reception unit to receive the broadcast content view history information transmitted by the first transmission unit through the network;

a display unit to display the broadcast content view history information received by the first reception unit;

a setting and inputting unit to set and input the broadcast content setting information; and a second transmission unit to transmit the broadcast content setting information set and input by the setting and inputting unit to the other pieces of electric equipment through the network, and each of the other pieces of electric equipments comprises:

a second reception unit to receive the broadcast content setting information transmitted by the second transmission unit through the network; and an update unit to update the broadcast content setting information stored in the broadcast content setting information storage unit based on the broadcast content setting information received by the second reception unit.

According to the first aspect of the present invention, each of the other electric equipment other than a specific piece of electric equip among the plurality of pieces of electric equipment stores the broadcast content setting information including the view limitation information for limiting the view of the predetermined broadcast contents with the broadcast content setting information storage unit. The electronic equipment stores the broadcast content view history information with the broadcast content view history information storage unit, and transmits the broadcast content view history information stored by the broadcast content view history information storage unit to the specific electric equipment through the network with the first transmission unit. Moreover, the specific electric equipment receives the broadcast content view history information transmitted through the network by the first transmission unit with the first reception unit, and displays the broadcast content view history information received by the first reception unit with the display unit. Then, the specific electric equipment sets and inputs the broadcast content setting information with the setting and inputting unit, and transmits the broadcast content setting information set and input by the setting and inputting unit to the other pieces of electric equipment connected to the network with the second transmission unit. Then, each of the other pieces of electric equipment receives the broadcast content setting information transmitted through the network by the second transmission unit with the second reception unit, and updates the broadcast content setting information stored in the broadcast content setting information storage unit based on the broadcast content setting information received by the second reception unit with the update unit. Consequently, it becomes possible to set the broadcast content setting information for limiting the view of the broadcast contents the view of which is not desired in a lump to each of the pieces of electric equipment, the broadcast content setting information set based on the broadcast content view history information in each of the pieces of electric equipment connected to the network, and the setting of the broadcast content setting information to each of the pieces of electric equipment can be made to be easy. Moreover, the specific electric equipment is the portable terminal, only the operator of the portable terminal becomes able to set and input the broadcast content setting information to the plurality of pieces of electric equipment in a lump, and the usability of a user in the electronic equipment control system can be improved.

In accordance with a second aspect of the invention, the electronic equipment control system includes a plurality of pieces of electric equipments connected with one another through a network, a specific electric equipment among the plurality of pieces of electric equipments controlling other pieces of electric equipments other than the specific electric equipment, wherein each of the other pieces of electric equipments comprises:

a broadcast content setting information storage unit to store broadcast content setting information regarding view of a broadcast content;

a broadcast content view history information storage unit to store broadcast content view history information; and a first transmission unit to transmit the broadcast content view history information stored in the broadcast content view history information storage unit to the specific electric equipment through the network, and the specific electric equipment is a portable terminal, and comprises:

a first reception unit to receive the broadcast content view history information transmitted by the first transmission unit through the network;

a display unit to display the broadcast content view history information received by the first reception unit;

a setting and inputting unit to set and input the broadcast content setting information; and a second transmission unit to transmit the broadcast content setting information set and input by the setting and inputting unit to the other pieces of electric equipment through the network, and each of the other pieces of electric equipments comprises:

a second reception unit to receive the broadcast content setting information transmitted by the second transmission unit through the network; and an update unit to update the broadcast content setting information stored in the broadcast content setting information storage unit based on the broadcast content setting information received by the second reception unit.

According to the second aspect of the present invention, each of the other pieces of electric equipment other than the specific electric equipment among the plurality of pieces of electric equipment stores the broadcast content setting information pertaining to the view of the broadcast content with the broadcast content setting information storage unit, and stores the broadcast content view history information with the broadcast content view history storage unit. Then, each of the other pieces of electric equipment transmits the broadcast content view history information stored in the broadcast content view history information to the specific electric equipment through the network with the first transmission unit. Moreover, the specific electric equipment receives the broadcast content view history information transmitted from the first transmission unit through the network with the first reception unit, and displays the broadcast content view history information received by the first reception unit with the display unit. The specific electric equipment further sets and inputs the broadcast content setting information with the setting and inputting unit, and transmits the broadcast content setting information set and input by the setting and inputting unit to the other pieces of electric equipment connected to the network through the network with the second transmission unit. Then, each of the other pieces of electric equipment receives the broadcast content setting information transmitted through the network by the second transmission unit with the second reception unit, and updates the broadcast content setting information stored in the broadcast content setting information storage unit with the update unit based on the broadcast content setting information received by the second reception unit. Consequently, the broadcast content setting information set based on the broadcast content view history information of each piece of electric equipment connected to the network becomes capable of being set in each piece of electric equipment in a lump, and the setting of the broadcast content setting information to each piece of electric equipment can be made to be easier.

In the second aspect of the invention, preferably, the specific electric equipment is a portable terminal.

According to such an electronic equipment control system, it is a matter of course that the advantages of the second aspect can be obtained. In addition, because the specific electric equipment is the portable terminal, only the operator of the portable terminal becomes able to set and input the broadcast content setting information into the plurality of pieces of electric equipment in a lump, and the usability of the user in the electronic equipment control system can be improved.

In accordance with a third aspect of the invention, the electronic equipment control system includes a plurality of pieces of electric equipments connected with one another through a network, wherein one piece of electric equipment among the plurality of pieces of electric equipments comprises:

a setting and inputting unit to set and input broadcast content setting information regarding view of a broadcast content;

a broadcast content setting information storage unit to store the broadcast content setting information;

a transmission unit to transmit the broadcast content setting information set and input by the setting and inputting unit to another piece of electric equipment connected to the network;

a reception unit to receive the broadcast content setting information transmitted from another piece of electric equipment connected to the network; and an update unit to update the broadcast content setting information stored in the broadcast content setting information storage unit based on the broadcast content setting information received by the reception unit.

According to the forth aspect of the present invention, the one piece of electric equipment among the plurality of pieces of electric equipment sets and inputs the broadcast content setting information pertaining to the view of the broadcast content with the setting and inputting unit, and stores the broadcast content setting information with the broadcast content setting information storage unit. The one piece of electric equipment further transmits the broadcast content setting information set and input by the setting and inputting unit to the other pieces of electric equipment connected to the network with the transmission unit. Moreover, the one piece of electric equipment receives the broadcast content setting information transmitted from the other pieces of electric equipment connected to the network with the reception unit, and updates the broadcast content setting information stored in the broadcast content setting information storage unit based on the broadcast content setting information received by the reception unit with the update unit. Consequently, the broadcast content setting information set in the one piece of electric equipment becomes capable of being set also in the other pieces of electric equipment in a lump, and the setting of the broadcast content setting information to each piece of electric equipment can be made to be easier.

In the second or third aspect of the invention, preferably, the broadcast content setting information includes view limitation information for limiting view of a predetermined broadcast content.

According to such an electronic equipment control system, it is a matter of course that the advantage of any one of the second to the fourth aspects of the present invention can be obtained. In addition, because the broadcast content setting information is the view limitation information for limiting the view of the predetermined broadcast contents, the broadcast contents the view of which is not desired can be limited in a lump in the plurality of pieces of electric equipment.

BRIEF DESCRIPTION OF THE DRAWINGS

FIG. 3 is a diagram illustrating the view history information stored in the view history information storage memory of a television receiver in the first embodiment;

FIG. 4 is a diagram illustrating the broadcast content view history information displayed on a display unit by the execution of the display program in the first embodiment;

FIG. 11 is a flow chart showing the view limitation information setting processing performed based on the broadcast content setting information transmitted from the other pieces of electric equipment in the one piece of electric equipment in the second embodiment.

DETAILED DESCRIPTION OF THE PREFERRED EMBODIMENTS

In the following, the preferred embodiments of the present invention will be described in detail with reference to the attached drawings.

First Embodiment

First, an electronic equipment control system Sa of a first embodiment to which the present invention is applied will be described with reference to FIGS. 1-6.

In the electronic equipment control system Sa of the present first embodiment, a plurality of pieces of electric equipment is connected with one another through a network N1. The following description is given on the supposition that a piece of specific electric equipment among these pieces of electric equipment is, for example, a portable telephone (portable terminal) 2, and that the other pieces of electric equipment other than the specific electric equipment are television receivers 1 (for example, television receivers 1a, 1b, 1c and 1d). These television receivers 1 may have the configuration including a connected piece of external equipment 4 such as a hard disc drive (HDD) recorder and a set top box (STB) like, for example, the television receiver 1d.

The network N1, to which the specific electric equipment and the other pieces of electric equipment other than the specific electric equipment are connected, is a wireless local area network (LAN) or the like following, for example, the Institute of Electrical and Electronic Engineers (IEEE) 802.11a/b/g standard or the like. However, the network N1 may be, for example, a wired network, or may be one applied by combining a wireless network and a wired network.

(Configuration of Television Receiver)

Figure 1:
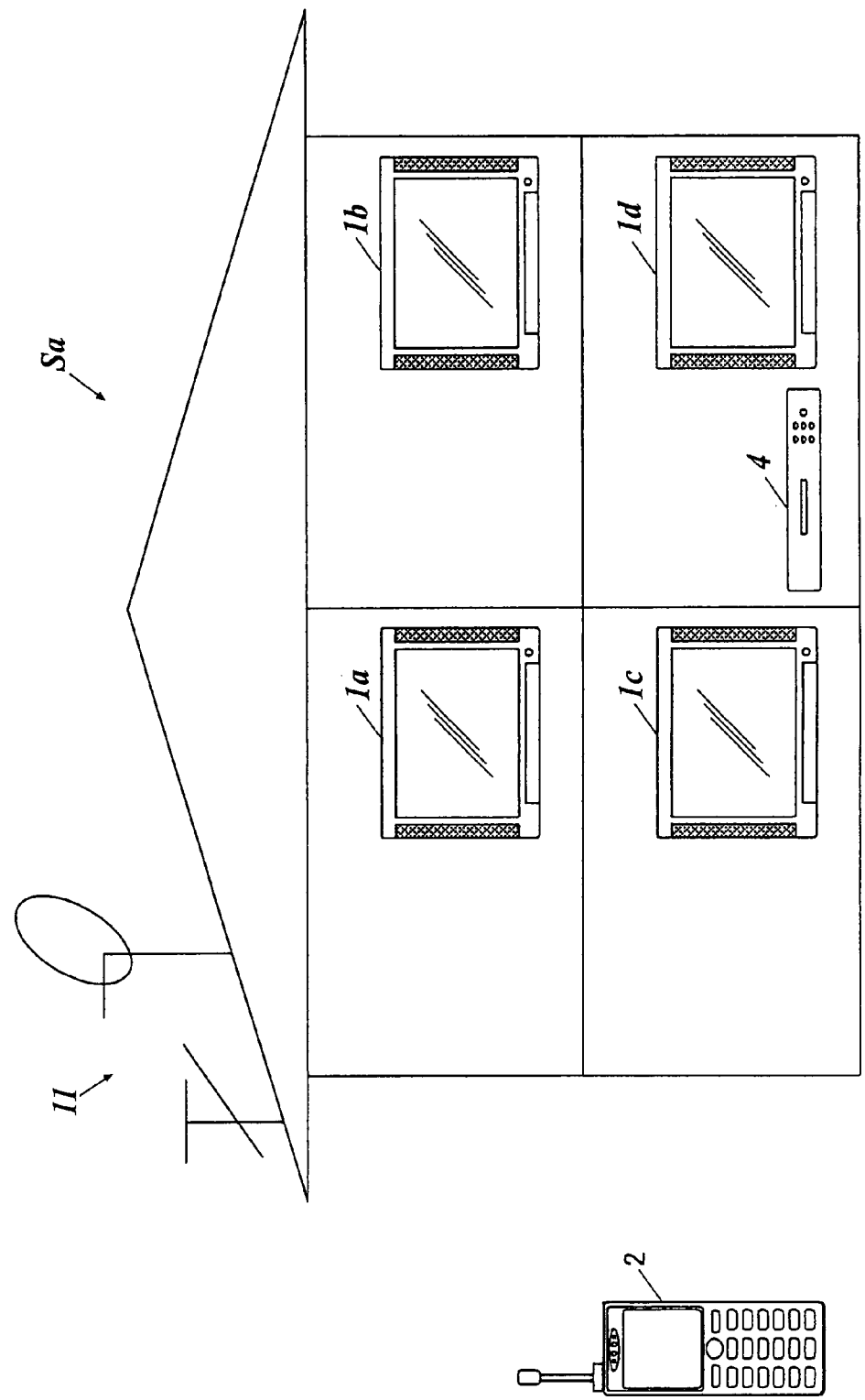
FIG. 1 is a view showing the whole configuration of an electronic equipment control system according to a first embodiment.
Figure 2:
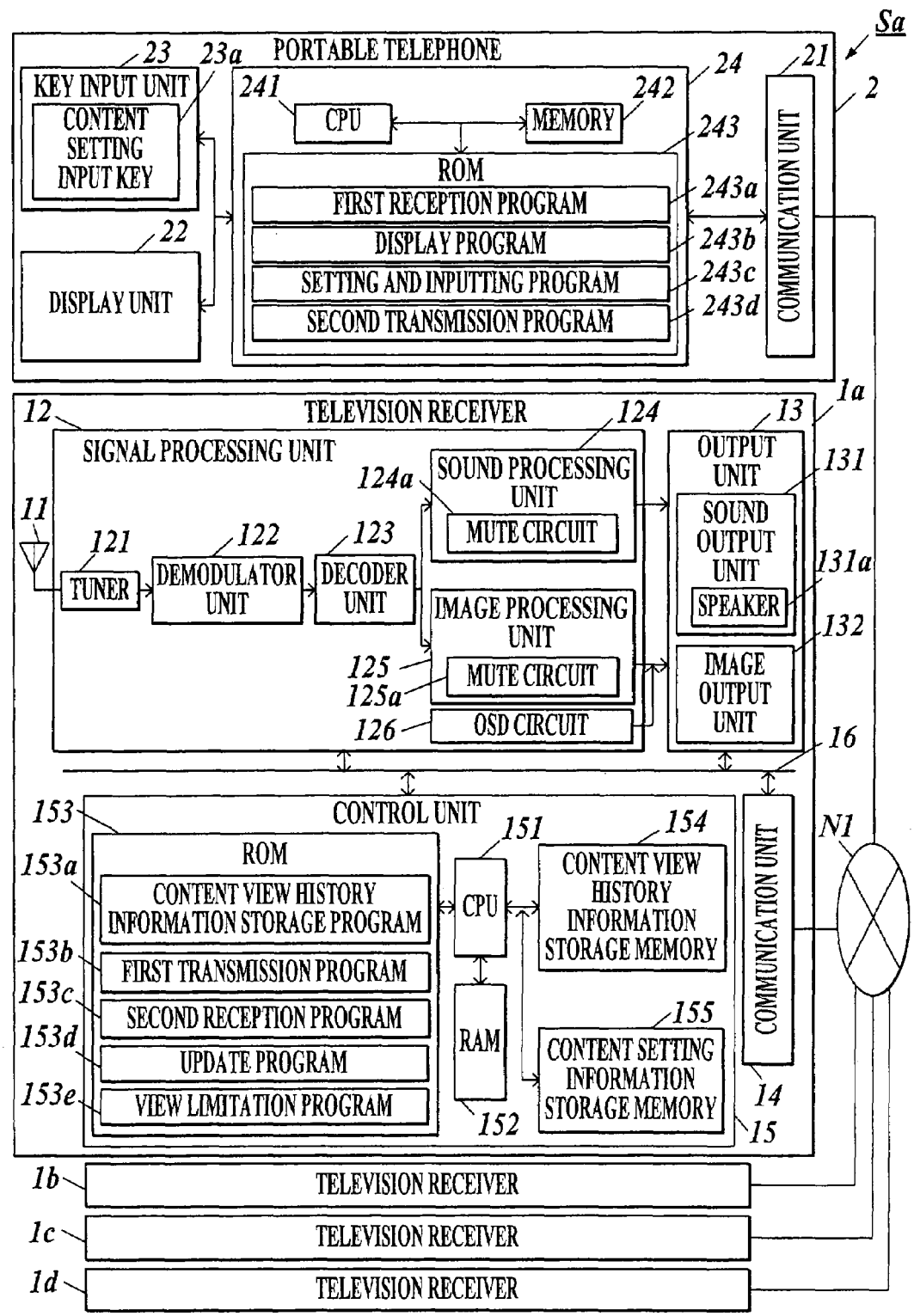
FIG. 2 is a block diagram showing the configuration of the principal part of the electronic equipment control system according to the first embodiment.

First, the configurations of the television receivers 1a, 1b, 1c and 1d as the other pieces of electric equipment among the plurality of pieces of electric equipment connected to the network N1 are described with reference to FIG. 2. Incidentally, the configurations of the television receivers 1a, 1b, 1c and 1d are supposed to be a common one, and one television receiver 1a is especially adopted here to be described and the descriptions of the other television receivers 1b, 1c and 1d are omitted.

The television receiver 1a is configured of, for example, an antenna 11, a signal processing unit 12, an output unit 13, a communication unit 14 and a control unit 15, and the signal processing unit 12, the output unit 13, the communication unit 14 and the control unit 15 are connected with one another through a bus 16.

The antenna 11 is, for example, a UHF antenna, a VHF antenna, a BS antenna or a CS antenna, and is disposed to face a predetermined direction outdoors to receive television broadcast signals transmitted from not shown television broadcasting stations. The antenna 11 is shared by, for example, the television receivers 1a, 1b, 1c and 1d.

The signal processing unit 12 is provided with, for example, a tuner 121, a demodulator unit 122, a decoder unit 123, an image processing unit 124, a sound processing unit 125, an OSD circuit 126 and the like.

The tuner 121 is configured to include, for example, a high frequency amplifier circuit and a frequency conversion circuit composed of a local oscillation circuit and a mixing circuit, although it is omitted to show them. The tuner 121 amplifies a television broadcast signal input by the antenna 11 or the like with the high frequency amplifier circuit, and mixes the amplified television broadcast signal with a local oscillation signal output from the local oscillation circuit with the mixing circuit. Furthermore, the tuner 121 receives an intermediate frequency signal (IF signal) in a specific frequency band according to a control output from the control unit 15 for tuning a specific frequency, and performs predetermined processing to the intermediate frequency signal to output the processed intermediate frequency signal to the demodulator unit 122.

The demodulator unit 122 executes, for example, the processing of the digital demodulation, an error correction and the like of an intermediate frequency signal output from the tuner 121 in accordance with an instruction from the control unit 15, and generates a transport stream (TS) to output the generated transport stream to the decoder unit 123.

The decoder unit 123 is provided with a TS decoder, a video decoder and an audio decoder, all not shown. The TS decoder separates a transport stream input from the demodulator unit 122 into a video stream under the Moving Picture Experts Group 2 (MPEG 2) standard, an audio stream, program (broadcast content) specific information/service information (PSI/SI) and the like, and supplies the video stream, the audio stream and the data included in the PSI/SI into the video decoder, the audio decoder and the control unit 15, respectively. To put it concretely, the decoder unit 123 extracts the information pertaining to a broadcast content such as time information, title information, genre information, rating information and the like from a broadcast signal that is a transport stream input from the demodulator unit 122, and outputs the extracted information to the control unit 15.

The video decoder decodes the video stream input from the TS decoder, and performs inverse discrete cosine transform (DCT) and motion-compensating control. Then, the vide decoder generates image data to output the generated image data to the image processing unit 124. Moreover, the audio decoder decodes the audio stream input from the TS decoder, and generates sound data to output the generated sound data to the sound processing unit 125.

The image processing unit 124 performs various kinds of processing such as D/A conversion to the image data input from the video decoder, and then generates a predetermined image signal. Moreover, the sound processing unit 125 performs various kinds of processing such as D/A conversion to the sound data input from the audio decoder, and then generates a predetermined sound signal. Moreover, the image processing unit 124 and the sound processing unit 125 are provided with a mute circuit 124a and a mute circuit 125a, respectively, and mute the image signal and the sound signal of a predetermined broadcast content based on the broadcast content setting information stored in a broadcast content setting information storage memory 155. The OSD circuit 126 performs the processing of synthesizing not shown OSD data stored in a ROM 153 with the image signal output from the image processing unit 124 according to an instruction output from the control unit 15. To put it concretely, the OSD circuit 126 synthesizes the predetermined OSD data with an image signal when the image signal and the sound signal of the predetermined broadcast content are muted based on the broadcast content setting information stored in the broadcast content setting information storage memory 155 (described below), and performs the information of the impossibility of the view of a broadcast content with an image output unit 131.

The output unit 13 is provided with, for example, the image output unit 131 and the sound output unit 132.

The image output unit 131 is provided with, for example, a display screen (the showing thereof is omitted) such as a liquid crystal display (LCD), a Plasma Display Panel (PDP), and makes an image be displayed based on the image signal input from the image processing unit 124.

The sound output unit 132 is provided with, for example, a speaker 132a and the like, and makes the speaker 132a output a sound based on the sound signal input from the sound processing unit 125.

The communication unit 14 is connected with the other television receivers 1b, 1c and 1d, and the portable telephone 2 as the specific electric equipment through, for example, the network N1. The communication unit 14 functions as a first transmission unit by transmitting the broadcast content view history information stored in a broadcast content view history information storage memory 154 of the television receiver 1a to the portable telephone 2 through the network N1, and functions as a second reception unit by receiving the broadcast content setting information transmitted from the portable telephone 2 through the network N1.

The control unit 15 is configured to include, for example, a central processing unit (CPU) 151, a random access memory (RAM) 152, a read only memory (ROM) 153, the broadcast content view history information storage memory 154 as a broadcast content view history information storage unit, the broadcast content setting information storage memory 155 as a broadcast content setting information storage unit, and the like.

The CPU 151 executes various programs stored in the ROM 153 according to the signals input from each unit of the television receiver 1a, and outputs control signals based on the programs to each unit. Thereby, the CPU 151 performs the integrated control of the whole operation of the television receiver 1a.

The RAM 152 is used as the work area of the CPU 151, and temporarily stores various programs read from the ROM 153, the data pertaining to these programs, and the like.

The broadcast content view history information storage memory 154 stores the information pertaining to the broadcast content viewed in the television receiver 1a. To put it concretely, as shown in FIG. 3, the data pertaining to each broadcast content such as the view date thereof, the view start time thereof, the view end time thereof, the channel thereof, the title thereof, the genre thereof and the rating information thereof is stored in the state of being correlated with one another to each broadcast content.

The rating information is, for example, the TV Parental Guidelines in the United States of America, or the like, which rates the broadcast contents for children into the ranks of TV-Y (All Children; the broadcast content suitable for all children) and TV-Y7 (Directed to Older Children; the broadcast content suitable for the children of seven years old or older), and rates the broadcast contents for the public into the ranks of TV-G (General Audience; the broadcast content that almost all parents will feel to be suitable for all ages), TV-PG (Parental Guidance Suggested; the broadcast content desired to be watched under the supervision of a protector), TV-14 (Parents Strongly Cautioned; the broadcast content needing the attention of a protector), TV-MA (Mature Audience Only; the broadcast content for adults) and the like.

The broadcast content setting information storage memory 155 stores broadcast content setting information including view limitation information for limiting the view of a predetermined broadcast content. When new broadcast content setting information is transmitted from the portable telephone 2, the broadcast content setting information stored in the broadcast content setting information storage memory 155 is updated based on the transmitted data. The view of the predetermined broadcast content in the television receivers 1 is limited based on the broadcast content setting information stored in the broadcast content setting information storage memory 155.

The ROM 153 stores various data processing programs to be executed by the CPU 151, various initialization values pertaining to the data processing programs and the like. To put it concretely, the ROM 153 stores, for example, the programs such as a broadcast content view history information storage program 153a, a first transmission program 153b, a second reception program 153c, an update program 153d, a view limitation program 153e and the like.

The broadcast content view history information storage program 153a is a program for enabling the CPU 151 to implement, for example, the function of storing broadcast content view history information.

To put it concretely, when a viewer views a broadcast content, the CPU 151 makes the broadcast content view history information storage memory 154 store the data pertaining to the viewed broadcast content extracted in the decoder unit 123 such as the view date thereof, the view start time thereof, the view end time thereof, the channel thereof, the broadcast content name thereof, the genre thereof, the rating information thereof and the like in the state of being associated with one another to each broadcast content.

By executing such a broadcast content view history information storage program 153a, the CPU 151 constitutes a broadcast content view history information storage unit together with the broadcast content view history information storage memory 154.

The first transmission program 153b is a program for enabling the CPU 151 to implement, for example, the function of transmitting the broadcast content view history information stored in the broadcast content view history information storage memory 154 by the execution of the broadcast content view history information storage program 153a to the portable telephone 2 as the specific electric equipment.

To put it concretely, when the CPU 151 receives a command requesting the transmission of the broadcast content view history information transmitted from the CPU 241 of the portable telephone 2 at predetermined timing through the communication unit 14, the CPU 151 reads the data stored in the broadcast content view history information storage memory 154 based on the received command, and transmits the read data to the portable telephone 2 through the network N1 with the communication unit 14.

By executing such a first transmission program 153b, the CPU 151 functions as the first transmission unit.

The second reception program 153c is a program for enabling the CPU 151 to implement, for example, the function of receiving the broadcast content setting information transmitted through the network N1 by the execution of a second transmission program 243d of the portable telephone 2.

To put it concretely, when the broadcast content setting information is transmitted through the network N1 by the portable telephone 2, the CPU 151 receives the broadcast content setting information with the communication unit 14.

By executing such a second reception program 153c, the CPU 151 functions as the second reception unit.

The update program 153d is a program for enabling the CPU 151 to implement, for example, the function of updating the broadcast content setting information stored in the broadcast content setting information storage memory 155 based on the broadcast content setting information received by the execution of the second reception program 153c.

To put it concretely, when the CPU 151 receives the broadcast content setting information transmitted from the portable telephone 2 by the execution of the second reception program 153c with the communication unit 14, the CPU 151 updates the broadcast content setting information stored in the broadcast content setting information storage memory 155 based on the received broadcast content setting information.

By executing such an update program 153d, the CPU 151 functions as an update unit.

The view limitation program 153e is a program for enabling the CPU 151 to implement, for example, the function of limiting the view of a broadcast content meeting the condition of the broadcast content to be limited to be viewed by muting an image signal and a sound signal in the mute circuits 124a and 125a based on the broadcast content setting information stored in the broadcast content setting information storage memory 155, and of performing the display of the OSD display for informing the impossibility of the view of the broadcast content.

To put it concretely, when a transport stream is input from the demodulator unit 122 to the decoder unit 123, the CPU 151 extracts the information pertaining to the broadcast content such as the time information thereof, the title information thereof, the genre information thereof, the rating information thereof and the like from the transport stream, and judges whether the extracted broadcast content information meets the condition of the broadcast content to be limited to be viewed, which condition is stored in the broadcast content setting information storage memory 155, or not. When the CPU 151 judges that the extracted broadcast content information meets the condition of the broadcast content to be limited to be viewed, which condition is stored in the broadcast content setting information storage memory 155, the CPU 151 mutes the sound signal in the mute circuit 125a of the sound processing unit 125, and mutes the image signal in the mute circuit 124a of the image processing unit 124. Furthermore, the CPU 151 performs the information of the impossibility of the view of the broadcast content (for example, "The broadcast content is blocked," or the like) by adding not shown OSD data stored in the ROM 153 to the image signal with the OSD circuit 126.

(Configuration of Portable Telephone)

Next, the portable telephone 2 as the specific electric equipment among the plurality of pieces of electric equipment connected to the network N1 is described.

The portable telephone 2 is configured to include a communication unit 21, a display unit 22 as a display unit, a key input unit 23 as a setting and inputting unit, a control unit 24 and the like.

The communication unit 21 is connected to the television receivers 1a, 1b, 1c and 1d as the other pieces of electric equipment through the network N1. The communication unit 21 functions as a first reception unit by receiving the broadcast content view history information transmitted from the television receivers 1a, 1b, 1c and 1d through the network N1, and functions as a second transmission unit by transmitting the broadcast content setting information set and input in the portable telephone 2 to the television receivers 1a, 1b, 1c and 1d as the other pieces of electric equipment connected to the network N1 through the network N1.

The display unit 22 is constructed of, for example, a LCD, a PDP or the like, and displays the broadcast content view history information transmitted from the television receivers 1a, 1b, 1c and 1d in the execution of a display program 243b described below.

The key input unit 23 is provided with a not shown plurality of keys. A user performs the setting and inputting of the broadcast content setting information by operating the keys of the key input unit 23, referring to the aforesaid broadcast content view history information displayed on the display unit 22, in the execution of a setting and inputting program 243c described below. Thereby, the key input unit 23 functions as the setting and inputting unit. Moreover, the key input unit 23 is provided with a content setting input key 23a. When the content setting input key 23a is depressed, the command requesting the transmission of the broadcast content view history information is led to be transmitted to each of the television receivers 1a, 1b, 1c and 1d connected to the network N1 through the network N1.

The control unit 24 is configured to include the central processing unit (CPU) 241, a memory 242, a read only memory (ROM) 243.

The CPU 241 executes various programs stored in the ROM 243 according to the signals input from each unit of the portable telephone 2, and outputs the control signals based on the programs to each unit. Thereby, the CPU 241 performs the integrated control of the whole operation of the portable telephone 2.

The memory 242 is provided with, for example, a not shown random access memory (RAM), and temporarily stores the various programs read from the ROM 243 and the data pertaining to these programs. The memory 242 is also provided with a not shown erasable programmable ROM (EPROM), and stores the broadcast content setting information set and input by the execution of the setting and inputting program 243c.

The ROM 243 stores various data processing programs to be executed by the CPU 241, and further stores various initialization values pertaining to the data processing programs. The ROM 243 stores the programs such as a first reception program 243a, the display program 243b, the setting and inputting program 243c and the second transmission program 243d.

The first reception program 243a is a program for enabling the CPU 241 to implement, for example, the function of receiving the broadcast content view history information transmitted through the network N1 by the execution of the first transmission program 153b in each of the television receivers 1a, 1b, 1c and 1d.

To put it concretely, the CPU 241 transmits the command requesting the transmission of broadcast content view history information to each of the television receivers 1a, 1b, 1c and 1d connected to the network N1 at predetermined timing (for example, when a user operates the content setting input key 23a in the key input unit 23). When the broadcast content view history information is transmitted from each of the television receivers 1a, 1b, 1c and 1d through the network N1 based on the command, the CPU 241 receives the broadcast content view history information with the communication unit 21. The command requests the transmission of the broadcast content view history information for predetermined days (for example, for three days), and the user can set the number of days on a menu screen or the like.

By executing such a first reception program 243a, the CPU 241 constitutes the first reception unit together with the communication unit 21.

The display program 243b is a program for enabling the CPU 241 to implement, for example, the function of making the display unit 22 display the broadcast content view history information received by the execution of the first reception program 243a.

To put it concretely, when the CPU 241 receives the broadcast content view history information transmitted through the network N1 from each of the television receivers 1a, 1b, 1c and 1d connected to the network N1 with the communication unit 21, the CPU 241 makes the display unit 22 display the list of the broadcast content view history information based on the received broadcast content view history information.

FIG. 4 is a view illustrating the broadcast content view history information displayed on the display unit 22 by the execution of the display program 243b, and the broadcast content view history information for the predetermined days (for example, for three days) that has been transmitted from each of the television receivers 1a, 1b, 1c and 1d is displayed in a list in the state in which an equipment ID number is attached to each broadcast content.

By executing such display program 243b, the CPU 241 constitutes the display unit together with the display unit 22.

The setting and inputting program 243c is a program for enabling the CPU 241 to implement, for example, the function of setting and inputting the broadcast content setting information.

To put it concretely, the CPU 241 makes the display unit 22 display a broadcast content setting and inputting screen for setting and inputting the broadcast content setting information. Then, when the broadcast content setting information is input by the key operation of the user with the key input unit 23, the CPU 241 stores the input broadcast content setting information into the memory 242. The broadcast content setting information is, for example, the view limitation information for limiting the view of a predetermined broadcast content, and the conditions of the broadcast content to be limited to be viewed can be set in the broadcast content setting and inputting screen. The user sets the conditions of the broadcast content to be limited to be viewed as a combination of the channel number thereof, the time zone thereof, the genre thereof, the rating information thereof and the like based on, for example, the broadcast content view history information displayed on the display unit 22 by the execution of the display program 243b.

Figure 5:
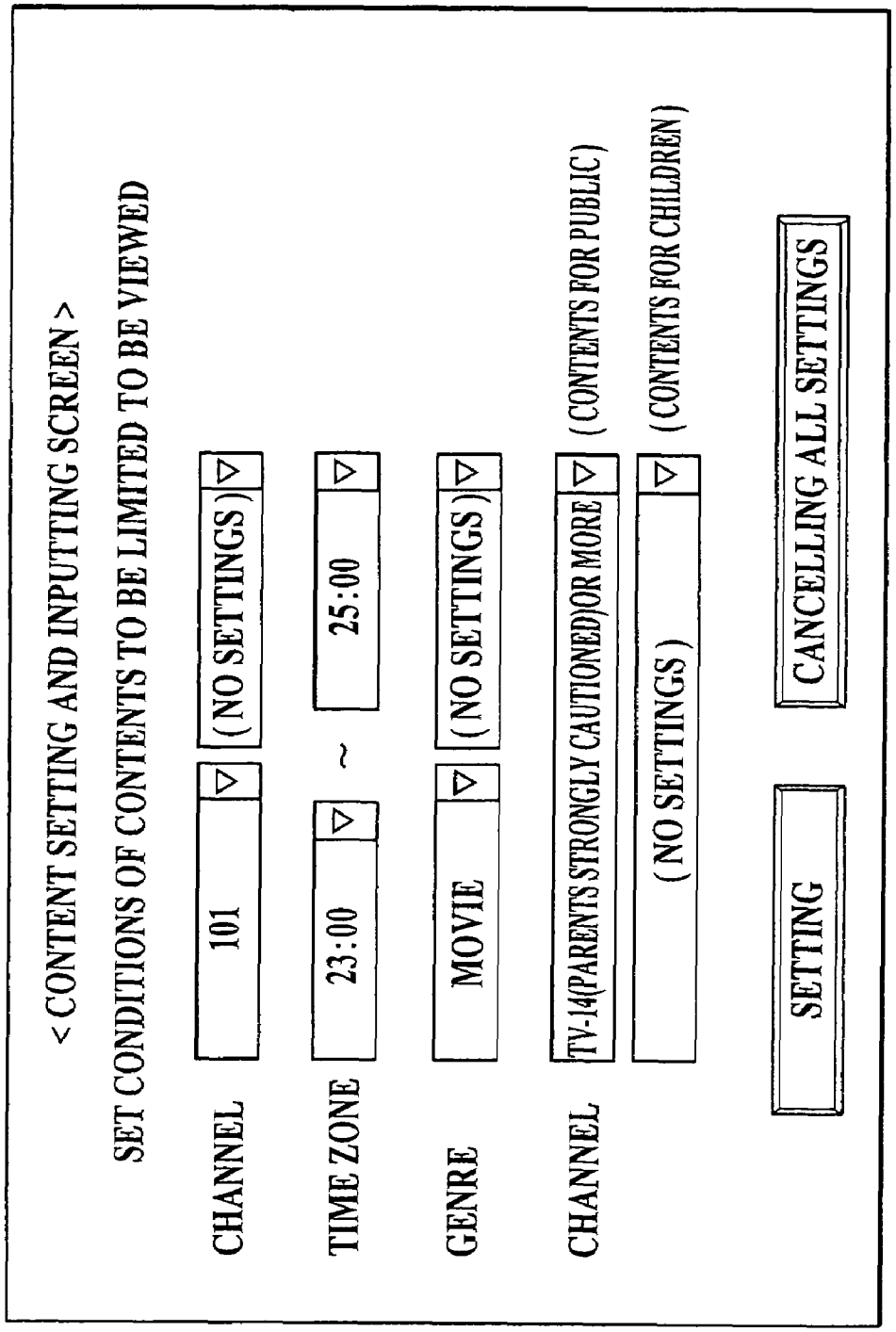
FIG. 5 is a view illustrating a broadcast content setting and inputting screen displayed on the display unit for enabling the setting and the inputting of broadcast content setting information which screen is displayed by the execution of a setting and inputting program in the first embodiment.

FIG. 5 is a view illustrating the broadcast content setting and inputting screen for enabling the input of the broadcast content setting information which screen is displayed on the display unit 22 by the execution of the setting and inputting program 243c, and the user sets and inputs the conditions of a broadcast content that the user does not desire to view, which conditions are a predetermined channel number (for example, 101), a time zone (for example, 23:00-25:00), a genre (for example, movie), a rating level (for example, TV-14 or more) by, for example, the operation of the key input unit 23. Then, the broadcast content setting information set and input in the broadcast content setting and inputting screen is stored in the memory 242.

By executing such a setting and inputting program 243c, the CPU 241 constitutes the setting and inputting unit together with the key input unit 23.

The second transmission program 243d is a program for enabling the CPU 241 to implement, for example, the function of transmitting the broadcast content setting information set and input by the execution of the setting and inputting program 243c to the television receivers 1a, 1b, 1c and 1d as the other pieces of electric equipment connected to the network N1.

To put it concretely, when the broadcast content setting information is set and input by the key operation of the user in the key input unit 23 in the broadcast content setting and inputting screen displayed on the display unit 22 by the execution of the setting and inputting program 243c and the set and input broadcast content setting information is stored in the memory 242, the CPU 241 transmits the broadcast content setting information stored in the memory 242 to each of the other television receivers 1a, 1b, 1c and 1d connected to the network N1 through the communication unit 21.

Then, each of the television receivers 1a, 1b, 1c and 1d receives the broadcast content setting information transmitted by the execution of the second transmission program 243d, and updates the broadcast content setting information of the broadcast content setting information storage memory 155. Then, after this, the image signal and the sound signal of a predetermined broadcast content meeting any of the conditions of the broadcast content to be limited to be viewed (for example, the broadcast content meeting any of the predetermined channel number (for example, 101), the time zone (for example, 23:00-25:00), the genre (for example, movie), the rating level (for example, TV-14 or more)) are muted in the mute circuits 124a and 125a based on the broadcast content setting information stored in the broadcast content setting information storage memory 155, and the viewing of the broadcast content becomes impossible.

By executing such a second transmission program 243d, the CPU 241 constitutes the second transmission unit together with the communication unit 21.

Figure 6:
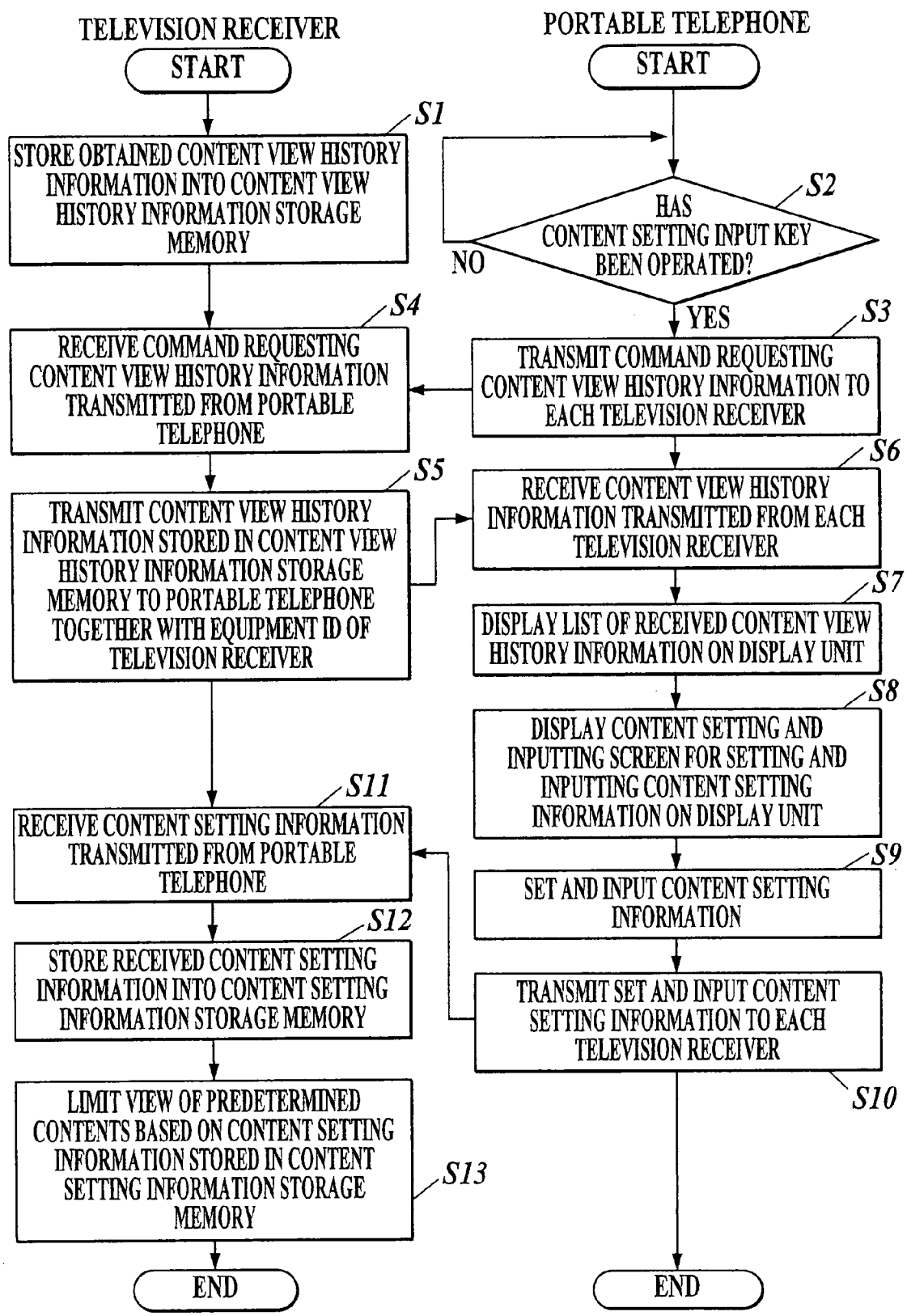
FIG. 6 is a flow chart showing the view limitation information setting processing in the first embodiment.

Next, the view limitation setting processing performed by the CPU 151 of each of the television receivers 1a, 1b, 1c and 1d and the CPU 241 of the portable telephone 2 is described with reference to FIG. 6. The view limitation setting processing is performed by the execution of the CPU 151 of each of the television receivers 1a, 1b, 1c and 1d of the broadcast content view history information storage program 153a, the first transmission program 153b, the second reception program 153c, the update program 153d and the view limitation program 153e, and by the execution of the CPU 241 of the portable telephone 2 of the first reception program 243a, the display program 243b and the second transmission program 243d.

First, when the view of a broadcast content is performed, the CPU 151 of each of the television receivers 1a, 1b, 1c and 1d obtains the broadcast content view history information pertaining to the viewed broadcast content such as the view date thereof, the view start time thereof, the view end time thereof, the channel thereof, the broadcast content name thereof, the genre thereof, the rating information thereof and the like with the decoder unit 123, and stores the obtained information into the broadcast content view history information storage memory 154 (Step S1).

On the other hand, the CPU 241 of the portable telephone 2 is monitoring the key operation of the key input unit 23, and judges whether the depression of the content setting input key 23a is performed or not at Step S2. When the CPU 241 judges that the depression of the content setting input key 23a is performed at Step S2 (Step S2; Yes), the CPU 241 transmits the command requesting the broadcast content view history information for predetermined days to each of the television receivers 1a, 1b, 1c and 1d connected to the network N1 (Step S3).

At Step S4, the CPU 151 of each of the television receivers 1a, 1b, 1c and 1d receives the command requesting the broadcast content view history information transmitted from the portable telephone 2, and transmits the broadcast content view history information stored in the broadcast content view history information storage memory 154 to the portable telephone 2 based on the command together with the equipment ID number of the television receiver 1 with the communication unit 14 (Step S5).

At Step S6, the CPU 241 of the portable telephone 2 receives the broadcast content view history information transmitted from each of the television receivers 1a, 1b, 1c and 1d connected to the network N1 with the communication unit 21, and makes the display unit 22 display the list of the broadcast content view history information transmitted from each of the television receivers 1a, 1b, 1c and 1d based on the received broadcast content view history information (Step S7). Successively, the CPU 241 makes the display unit 22 display the broadcast content setting and inputting screen for the input of the broadcast content setting information based on the user's predetermined key operation (Step S8). Then, when the conditions of the broadcast content to be limited to be viewed are set and input by the user's key operation of the key input unit 23 in the broadcast content setting and inputting screen (Step S9), the CPU 241 stores the set and input broadcast content setting information into the memory 242. At Step S10, the CPU 241 transmits the broadcast content setting information that has been set and input by the user and has been stored in the memory 242 to each of the television receivers 1a, 1b, 1c and 1d connected to the network N1 with the communication unit 21, and ends the present processing.

At Step S11, the CPU 151 of each of the television receivers 1a, 1b, 1c and 1d receives the broadcast content setting information transmitted from the portable telephone 2, and updates the broadcast content setting information stored in the broadcast content setting information storage memory 155 based on the received broadcast content setting information (Step S12). After that, the CPU 151 limits the view of the broadcast content meeting the conditions of the broadcast content to be limited to be viewed by muting the image signal and the sound signal of the broadcast content in the mute circuits 124a and 125a based on the broadcast content setting information stored in the broadcast content setting information storage memory 155, and makes the image output unit 132 display the OSD display for the information of the impossibility of the view of the broadcast content (Step S13). Then, the CPU 151 ends the present processing.

According to the electronic equipment control system Sa of the first embodiment described above, in each of the television receivers 1a, 1b, 1c and 1d, the broadcast content setting information including the view limitation information for limiting the view of the predetermined broadcast content is stored in the broadcast content setting information storage memory 155, and the broadcast content view history information is stored in the broadcast content view history information storage memory 154 by the execution of the broadcast content view history information storage program 153a by the CPU 151. Then, by the execution of the first transmission program 153b by the CPU 151, the broadcast content view history information stored in the broadcast content view history information storage memory 154 is transmitted to the portable telephone 2 through the network N1. Moreover, in the portable telephone 2, by the execution of the first reception program 243a by the CPU 241, the broadcast content view history information transmitted through the network N1 by the execution of the first transmission program 153b is received, and by the execution of the display program 243b by the CPU 241, the broadcast content view history information received by the first reception program 243a is displayed on the display unit 22. Then, by the execution of the setting and inputting program 243c by the CPU 241, the broadcast content setting information including the view limitation information for limiting the view of the predetermined broadcast content is set and input based on the user's key operation in the key input unit 23, and by the execution of the second transmission program 243d by the CPU 241, the set and input broadcast content setting information is transmitted to each of the television receivers 1a, 1b, 1c and 1d through the network N1. Then, in each of the television receivers 1a, 1b, 1c and 1d, by the execution of the second reception program 153c by the CPU 151, the broadcast content setting information transmitted through the network N1 by the execution of the second transmission program 243d is received, and by the execution of the update program 153d by the CPU 151, the broadcast content setting information stored in the broadcast content setting information storage memory 155 based on the broadcast content setting information received by the execution of the second reception program 153c is updated.

Consequently, it becomes possible to set the broadcast content setting information for limiting the view of the broadcast content that is not desired to be viewed which information has been set based on the broadcast content view history information in each of the television receivers 1a, 1b, 1c and 1d connected to the network N1 in each of the television receivers 1a, 1b, 1c and 1d in a lump, and the setting of the broadcast content setting information to each of the television receivers 1a, 1b, 1c and 1d can be made to be easier. Moreover, because the specific electric equipment is the portable telephone 2, only the operator of the portable telephone 2 becomes able to set and input the broadcast content setting information into the plurality of television receivers 1 in a lump, and the usability of the user in the electronic equipment control system Sa can be improved.

Second Embodiment

Next, an electronic equipment control system Sb of a second embodiment to which the present invention is applied will be described with reference to FIGS. 7-10.

In the electronic equipment control system Sb of the present first embodiment, a plurality of pieces of electric equipment is connected with one another through a network N2. The following description is given on the supposition that the pieces of electric equipment are television receivers 3 (for example, television receivers 3a, 3b, 3c and 3d).

Figure 7:
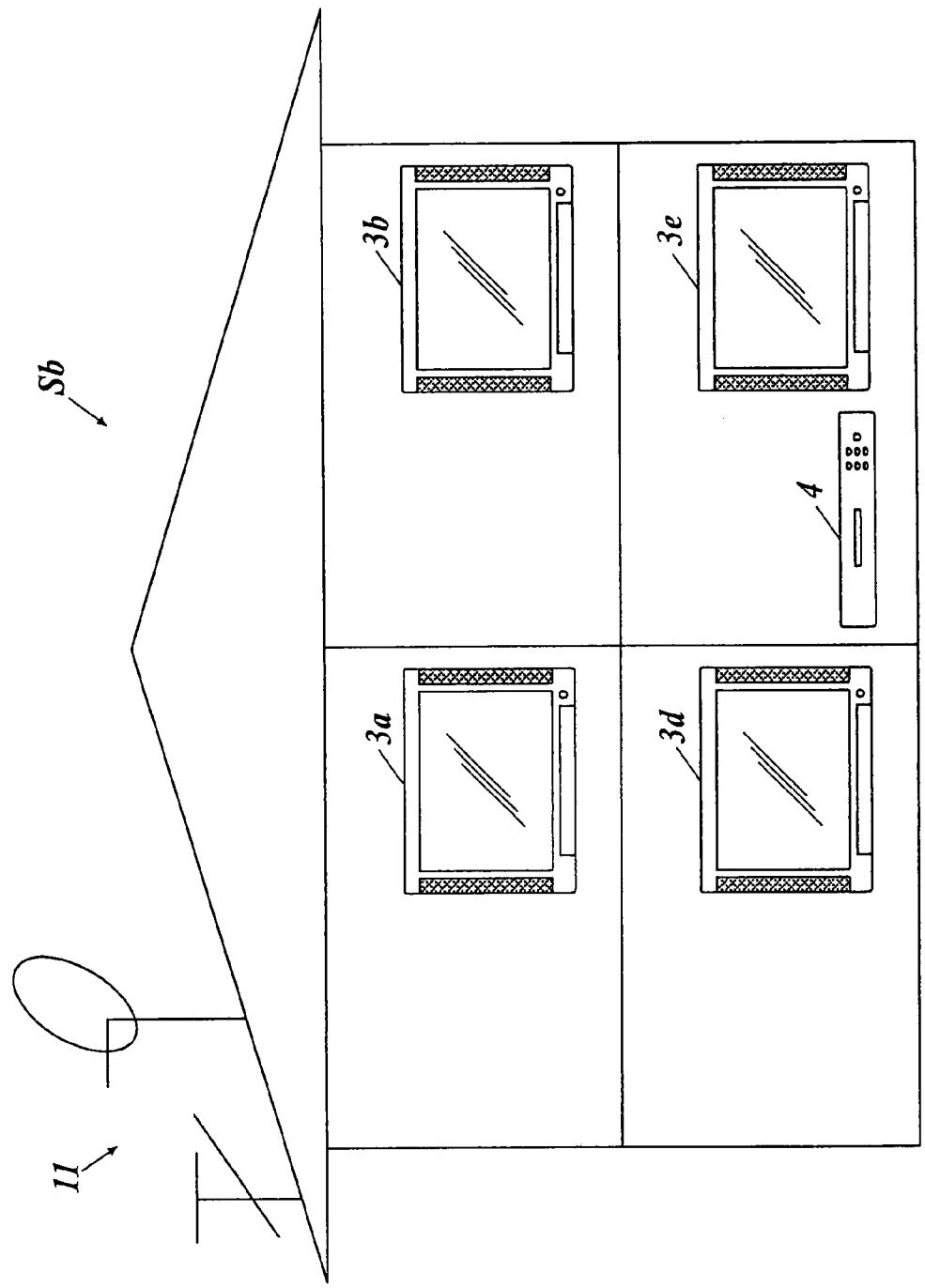
FIG. 7 is a view showing the whole configuration of an electronic equipment control system according to a second embodiment.
Figure 8:
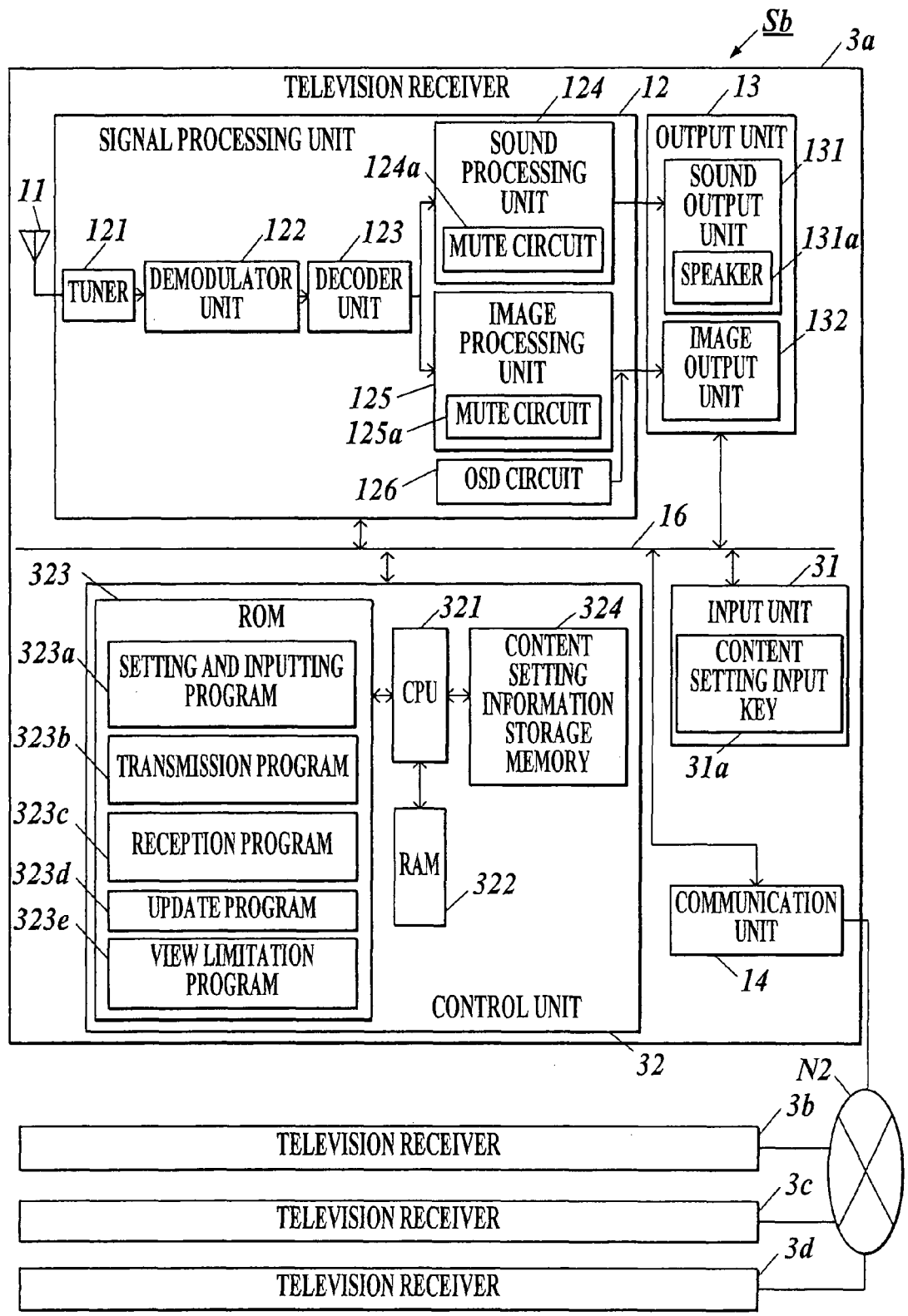
FIG. 8 is a block diagram showing the configuration of the principal part of the electronic equipment control system according to the second embodiment.

First, the configurations of the television receivers 3a, 3b, 3c and 3d connected to the network N2 are described with reference to FIG. 7.

Incidentally, the configurations of the television receivers 3a, 3b, 3c and 3d are supposed to be a common one, and one television receiver 3a is especially adopted here to be described and the descriptions of the other television receivers 3b, 3c and 3d are omitted.

The television receiver 3a is configured to include, for example, the antenna 11, the signal processing unit 12, the output unit 13, a key input unit 31, the communication unit 14 and a control unit 32.

Here, the same components in each component of the television receiver 3a as those of the television receiver 1a of the firs embodiment are denoted by the same reference marks as those of the first embodiment, and their descriptions are omitted.

The key input unit 31 is provided with a not shown plurality of keys, and in the execution of a setting and inputting program 323a described below, the input of the broadcast content setting information based on a user's key operation is performed. Thereby, the key input unit 31 functions as the setting and inputting unit. Moreover, the key input unit 31 is provided with a content setting input key 31a, and a broadcast content setting and inputting screen for the input of the broadcast content setting information is led to be displayed on the image output unit 131 based on the operation of the content setting input key 31a.

The control unit 32 is configured to include, for example, a central processing unit (CPU) 321, a random access memory (RAM) 322, a read only memory (ROM) 323 and a broadcast content setting information storage memory 324 as the broadcast content setting information storage unit, and the like.

The CPU 321 executes various programs stored in the ROM 323 according to the signals input from each unit of the television receiver 3a, and outputs control signals based on the programs to each unit. Thereby, the CPU 321 performs the integrated control of the whole operation of the television receiver 3a.

The RAM 322 is used as the work area of the CPU 321, and temporarily stores various programs read from the ROM 323, the data pertaining to these programs, and the like.

The broadcast content setting information storage memory 324 stores broadcast content setting information including view limitation information for limiting the view of a predetermined broadcast content that has been set and input in the television receiver 3a or has been transmitted from the other television receivers 3b, 3c and 3d. Whenever new broadcast content setting information is set and input or transmitted, the broadcast content setting information stored in the broadcast content setting information storage memory 324 is updated based on the new broadcast content setting information. The view of the predetermined broadcast content in the television receiver 3a is limited based on the broadcast content setting information stored in the broadcast content setting information storage memory 324.

The ROM 323 stores various data processing programs to be executed by the CPU 321, various initialization values pertaining to the data processing programs and the like. The ROM 323 stores, for example, the programs such as the setting and inputting program 323a, a transmission program 323b, a reception program 323c, an update program 323d, a view limitation program 323e and the like.

The setting and inputting program 323a is a program for enabling the CPU 321 to implement, for example, the function of setting and inputting the broadcast content setting information.

To put it concretely, the CPU 321 makes the image output unit 131 display a broadcast content setting and inputting screen for setting and inputting broadcast content setting information based on a user's operation of the content setting input key 31a in the key input unit 31. When the broadcast content setting information is input into the CPU 321 based on the user's key operation in the key input unit 31, the CPU 321 makes the broadcast content setting information storage memory 324 store the input broadcast content setting information. The broadcast content setting information is, for example, the view limitation information for limiting the view of the predetermined broadcast content, and the conditions of the broadcast content to be limited to be viewed can be set in the broadcast content setting and inputting screen. The user sets the conditions of the broadcast content to be limited to be viewed by means of, for example, the combination of the channel number thereof, the time zone thereof, the rating information thereof and the like.

Figure 9:
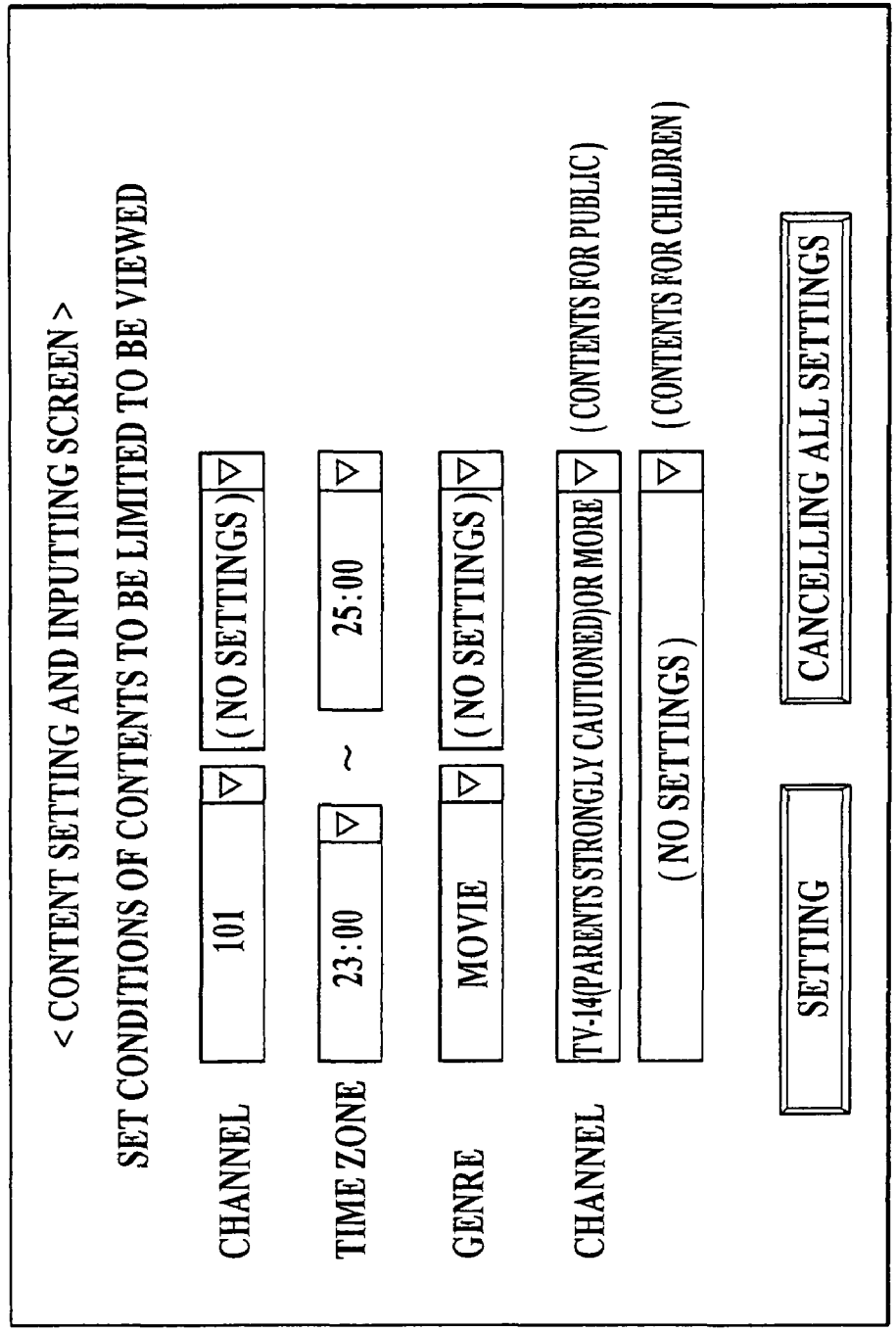
FIG. 9 is a view illustrating a broadcast content setting and inputting screen displayed on an image output unit for enabling the setting and the inputting of broadcast content setting information which screen is displayed by the execution of a setting and inputting program in the second embodiment.

FIG. 9 is a view illustrating the broadcast content setting and inputting screen for enabling the input of the broadcast content setting information which screen is displayed on the image output unit 131 by the execution of the setting and inputting program 323a, and the user sets and inputs the conditions of a broadcast content that the user does not desire to view, which conditions are a predetermined channel number (for example, 101), a time zone (for example, 23:00-25:00), a genre (for example, movie), a rating level (for example, TV-14 or more) by, for example, the operation of the key input unit 23. Then, the broadcast content setting information set and input in the broadcast content setting and inputting screen is stored in the broadcast content setting information storage memory 324.

By executing such a setting and inputting program 323a, the CPU 321 constitutes the setting and inputting unit together with the key input unit 31.

The transmission program 323b is a program for enabling the CPU 321 to implement, for example, the function of transmitting the broadcast content setting information set and input by the execution of the setting and inputting program 323a to the other television receivers 3b, 3c and 3d connected to the net work N1.

To put it concretely, when the broadcast content setting information is set and input by the key operation of the user in the key input unit 31 in the broadcast content setting and inputting screen displayed on the image output unit 131 by the execution of the setting and inputting program 323a and the set and input broadcast content setting information is stored in the broadcast content setting information storage memory 324, the CPU 321 transmits the broadcast content setting information stored in the broadcast content setting information storage memory 324 to each of the other television receivers 3b, 3c and 3d connected to the network N1 through the communication unit 14.

By executing such a transmission program 323b, the CPU 321 constitutes the transmission unit together with the communication unit 14.

The reception program 323c is a program for enabling the CPU 321 to implement, for example, the function of receiving the broadcast content setting information transmitted through the network N2 by the execution of a transmission program 323b in each of the other television receivers 3b, 3c and 3d.

To put it concretely, when the broadcast content setting information is transmitted through the network N2 by the television receivers 3b, 3c and 3d, the CPU 321 receives the broadcast content setting information with the communication unit 14.

By executing such a reception program 323c, the CPU 321 constitutes the reception unit together with the communication unit 14.

The update program 323d is a program for enabling the CPU 321 to implement, for example, the function of updating the broadcast content setting information stored in the broadcast content setting information storage memory 324 based on the broadcast content setting information received by the execution of the reception program 323c.

To put it concretely, when the CPU 321 receives the broadcast content setting information transmitted from the other television receivers 3b, 3c and 3d by the execution of the reception program 323c with the communication unit 14, the CPU 321 updates the broadcast content setting information stored in the broadcast content setting information storage memory 324 based on the received broadcast content setting information.

By executing such an update program 323d, the CPU 321 functions as the update unit.

The view limitation program 323e is a program for enabling the CPU 321 to implement, for example, the function of limiting the view of a broadcast content meeting the condition of the broadcast content to be limited to be viewed by muting an image signal and a sound signal in the mute circuits 124a and 125a based on the broadcast content setting information stored in the broadcast content setting information storage memory 324, and of performing the display of the OSD display for informing the impossibility of the view of the broadcast content on the image output unit 132.

To put it concretely, when a broadcast signal received by the antenna 11 is input into the decoder unit 123, the CPU 321 extracts the information pertaining to the broadcast content such as the time information thereof, the title information thereof, the genre information thereof, the rating information thereof and the like from the broadcast signal, and judges whether the extracted broadcast content information meets the condition of the broadcast content to be limited to be viewed, which condition is stored in the broadcast content setting information storage memory 324, or not. When the CPU 321 judges that the extracted broadcast content information meets the condition of the broadcast content to be limited to be viewed, which condition is stored in the broadcast content setting information storage memory 324, the CPU 321 mutes the sound signal in the mute circuit 125a of the sound processing unit 125, and mutes the image signal in the mute circuit 124a of the image processing unit 124. Furthermore, the CPU 321 performs the information of the impossibility of the view of the broadcast content (for example, "The broadcast content is blocked," or the like) by adding not shown OSD data stored in the ROM 323 to the image signal with the OSD circuit 126.

Next, the view limitation setting processing performed by the CPU 321 of each of the television receivers 3a, 3b, 3c and 3d is described with reference to FIGS. 10 and 11. Incidentally, in the present processing, the television receiver 3a is described as one piece of electronic equipment, and the other television receivers 3b, 3c and 3d connected to the network N2 are described as the other pieces of electronic equipment. But, when any one of the other television receivers 3b, 3c and 3d executes the present processing as the one piece of electric equipment, the other television receivers 3 including the television receiver 3a become the other pieces of electric equipment. The processing in FIG. 10 of the view limitation setting processing is the processing of transmitting the set and input broadcast content setting information to the television receivers 3b, 3c and 3d as the other pieces of electric equipment by the execution of the setting and inputting program 323a and the transmission program 323b by the CPU 321 of the television receiver 3a as the one piece of electric equipment. Moreover, the processing of FIG. 11 is the processing of performing the view limitation of a predetermined broadcast content based on the broadcast content setting information transmitted from any of the television receivers 3b, 3c and 3d as the other pieces of electric equipment by the execution of the reception program 323c, the update program 323d and the view limitation program 323e by the CPU 321 of the television receiver 3a as the one piece of electric equipment.

Figure 10:
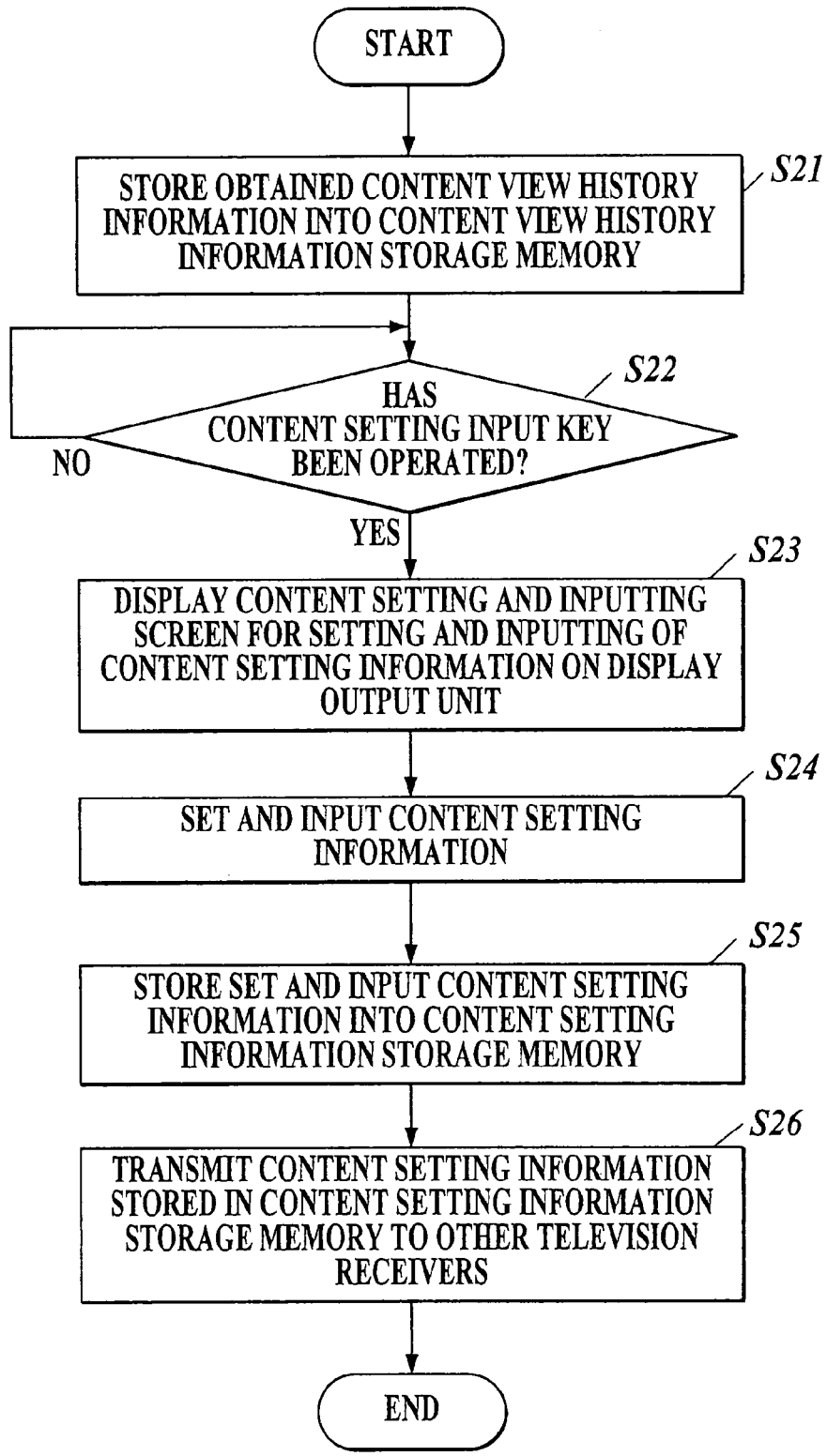
FIG. 10 is a flow chart showing the view limitation information setting processing transmitting broadcast content setting information to the other pieces of electric equipment in one piece of electric equipment in the second embodiment.

First, in FIG. 10, when the view of a broadcast content is performed, the CPU 321 of the television receiver 3a obtains the broadcast content view history information pertaining to the viewed broadcast content such as the view date thereof, the view start time thereof, the view end time thereof, the channel thereof, the broadcast content name thereof, the genre thereof, the rating information thereof and the like with the decoder unit 123, and stores the obtained information into a predetermined region (Step S21). Next, the CPU 321 monitors the key operation of the key input unit 31, and judges whether the depression of the content setting input key 31a is performed or not at Step S22. When the CPU 321 judges that the depression of the content setting input key 31a is performed at Step S22 (Step S22; Yes), the CPU 321 makes the image output unit 132 display the broadcast content setting and inputting screen for inputting the broadcast content setting information (Step S23). When the conditions of the broadcast content to be limited to be viewed are set and input by a user's key operation of the key input unit 31 in the broadcast content setting and inputting screen (Step S24), the CPU 321 stores the set and input broadcast content setting information into the broadcast content setting information storage memory 324 (Step S25). At Step S26, the CPU 321 transmits the broadcast content setting information that has been set and input by the user and has been stored in the broadcast content setting information storage memory 324 to the other television receivers 3b, 3c and 3d connected to the network N2 with the communication unit 14, and ends the present processing.

On the other hand, in FIG. 11, the CPU 321 of the television receiver 3a receives the broadcast content setting information transmitted another television receiver 3 (i.e. any one of the other television receivers 3b, 3c and 3d) at Step S31, and updates the broadcast content setting information in the broadcast content setting information storage memory 324 based on the received broadcast content setting information at Step S32. After that, the CPU 321 of the television receiver 3a limits the view of the broadcast content of the broadcast content meeting the conditions of the broadcast content to be limited to be viewed by muting the image signal and the sound signal of the broadcast content in the mute circuits 124a and 125a based on the broadcast content setting information stored in the broadcast content setting information storage memory 324, and displays the OSD display for the information of the impossibility of the view of the broadcast content (Step S33). Then, the CPU 321 ends the present processing.

According to the electronic equipment control system Sb of the second embodiment described above, in one television receiver 3 (for example, the television receiver 3a) of the plurality of television receivers 3a, 3b, 3c and 3d, the broadcast content setting information including the view limitation information for limiting the view of the predetermined broadcast content is set and input by the execution of the setting and inputting program 323a by the CPU 321, and the set and input broadcast content setting information is stored in the broadcast content setting information storage memory 324. Furthermore, the broadcast content setting information set and input by the execution of the setting and inputting program 323a is transmitted to the other television receivers 3 (i.e. the television receivers 3b, 3c and 3d) connected to the network N2 by the execution of the transmission program 323b by the CPU 321. Moreover, by the execution of the reception program 323c by the CPU 321, the broadcast content setting information transmitted from the other television receivers 3 (e.g. the television receivers 3b, 3c and 3d) connected to the network N2 is received, and by the execution of the update program 323d by the CPU 321, the broadcast content setting information stored in the broadcast content setting information storage memory 324 is updated based on the broadcast content setting information received by the execution of the reception program 323c. Consequently, it becomes possible to set the broadcast content setting information for limiting the view of the broadcast content that is not desired to be viewed which information has been individually set in the television receivers 3a, 3b, 3d and 3d connected to the network N2 in each of the television receivers 3a, 3b, 3c and 3d in a lump, and the setting of the broadcast content setting information to each of the television receivers 3a, 3b, 3c and 3d can be made to be easier.

Incidentally, the present invention is not limited to the embodiments described above, but various improvements and changes of design may be performed without departing from the spirit and the scope of the present invention.

For example, the method of limiting the view of the predetermined broadcast content is not limited to the method by means of the mute circuits 124a and 125a, but the configuration of making the reception of the broadcast signal of the broadcast content impossible in the tuner 121 may be adopted.

Moreover, for example, the broadcast content setting information and the view limitation information are not limited to that of the combination of the channel number, the time zone, the genre, the rating information and the like illustrated in the above embodiments, but a predetermined title may be adopted.

Moreover, for example, the second transmission program 243d or the transmission program 323b may be the configuration capable of specifying the electric equipment that transmits the broadcast content setting information among the plurality of pieces of electric equipment. By the configuration, it becomes possible to finely set the broadcast content setting information according to the intention of a user, and an electronic equipment control system S having better usability can be configured.

Moreover, the broadcast content view history information, which is extracted from a broadcast signal and is stored by the execution of the broadcast content view history information storage program 153a, is not limited to that illustrated in the above embodiments. For example, the rating information may be the information that is not rated by ages but is rated by the contents thereof.

Moreover, in the electronic equipment control system Sa of the first embodiment, the specific electric equipment is not limited to the portable telephone 2, and also the other pieces of electric equipment are not limited to the television receivers 1. That is, for example, the portable telephone 2 may be configured to be equipped with the function of the television receiver to be one of the other pieces of electric equipment, and to be capable of performing the view of the broadcast content based on the broadcast content setting information transmitted from the specific electric equipment. Alternatively, the portable telephone 2 may be configured to be the specific electric equipment equipped with the function of a television receiver, and the broadcast content setting information may be set and input based on the broadcast content view history information stored in the portable telephone 2 and the broadcast content view history information stored in the other pieces of electric equipment. Thereby, the portable telephone 2 may be configured to transmit the broadcast content setting information to the other pieces of electric equipment.

Moreover, in the electronic equipment control system Sb of the second embodiment, the configuration in which the view history information is stored and the broadcast content setting information is set and input based on the view history information similarly to the first embodiment may be adopted.

Moreover, the broadcast content setting information is not limited to that including the view limitation information for limiting the view of the predetermined broadcast content, but, for example, the information may be that for forcibly performing the view of only the predetermined broadcast content, or may be that enabling the view of only the predetermined broadcast content.

The present U.S. patent application claims a priority under the Paris Convention of Japanese patent application No. 2006-113611 filed on Apr. 17, 2006, and shall be a basis of correction of an incorrect translation.

What is claimed is:

1. An electronic equipment control system including a plurality of pieces of electric equipment connected with one another through a network, a specific piece of electric equipment among the plurality of pieces of electric equipment controlling other pieces of electric equipment other than the specific piece of electric equipment, wherein each of the other pieces of electric equipment comprises:
    a broadcast content setting information storage unit to store broadcast content setting information for the other pieces of electric equipment including view limitation information to limit view of a predetermined broadcast content;
    a broadcast content view history information storage unit to store broadcast content view history information; and
    a first transmission unit to transmit the broadcast content view history information stored in the broadcast content view history information storage unit to the specific piece of electric equipment through the network, and
    the specific piece of electric equipment is a portable terminal, and comprises:

a first reception unit to receive the broadcast content view history information transmitted by the first transmission unit through the network;

a display unit to display the broadcast content view history information received by the first reception unit;

a setting and inputting unit to set and input the broadcast content setting information for the other pieces of electric equipment based on the broadcast content view history information; and a second transmission unit to transmit the broadcast content setting information set and input by the setting and inputting unit to the other pieces of electric equipment through the network, and each of the other pieces of electric equipment comprises:

a second reception unit to receive the broadcast content setting information for the other pieces of electric equipment transmitted by the second transmission unit through the network;

an update unit to update the broadcast content setting information stored in the broadcast content setting information storage unit based on the broadcast content setting information received by the second reception unit;

a sound processing unit;

an image processing unit; and an output unit, wherein the setting and inputting unit includes a content setting input key, and when the content setting input key is depressed, a command to request transmission of the broadcast content view history information for a predetermined number of days set by a user of the specific piece of electric equipment is transmitted to the other pieces of electric equipment through the network, and each of the other pieces of electric equipment transmits the broadcast content view history information based on the command by the first transmission unit to the specific piece of electric equipment, wherein the broadcast content setting information for the other pieces of electric equipment set and input by the setting and inputting unit of the specific piece of electric equipment based on the broadcast content view history information received by the first reception unit of the specific piece of electric equipment is set in the other pieces of electric equipment in a lump, and wherein when a program matching the broadcast content setting information is selected, a sound and an image of the program are muted by the sound processing unit and the image processing unit, respectively, and impossibility of viewing the program is informed on the output unit.

2. An electronic equipment control system including a plurality of pieces of electric equipment connected with one another through a network, a specific piece of electric equipment among the plurality of pieces of electric equipment controlling other pieces of electric equipment other than the specific piece of electric equipment, wherein each of the other pieces of electric equipment comprises:

a broadcast content setting information storage unit to store broadcast content setting information for the other pieces of electric equipment regarding view of a broadcast content;

a broadcast content view history information storage unit to store broadcast content view history information; and a first transmission unit to transmit the broadcast content view history information stored in the broadcast content view history information storage unit to the specific piece of electric equipment through the network, and wherein the specific piece of electric equipment comprises:

a first reception unit to receive the broadcast content view history information transmitted by the first transmission unit through the network;

a display unit to display the broadcast content view history information received by the first reception unit;

a setting and inputting unit to set and input the broadcast content setting information for the other pieces of electric equipment based on the broadcast content view history information; and a second transmission unit to transmit the broadcast content setting information set and input by the setting and inputting unit to the other pieces of electric equipment through the network, and each of the other pieces of electric equipment comprises:

a second reception unit to receive the broadcast content setting information for the other pieces of electric equipment transmitted by the second transmission unit through the network;

an update unit to update the broadcast content setting information stored in the broadcast content setting information storage unit based on the broadcast content setting information received by the second reception unit;

a sound processing unit;

an image processing unit; and an output unit, wherein the setting and inputting unit includes a content setting input key, and when the content setting input key is depressed, a command to request transmission of the broadcast content view history information for a predetermined number of days set by a user of the specific piece of electric equipment is transmitted to the other pieces of electric equipment through the network, and each of the other pieces of electric equipment transmits the broadcast content view history information based on the command by the first transmission unit to the specific piece of electric equipment, wherein the broadcast content setting information for the other pieces of electric equipment set and input by the setting and inputting unit of the specific piece of electric equipment based on the broadcast content view history information received by the first reception unit of the specific piece of electric equipment is set in the other pieces of electric equipment in a lump, and wherein when a program matching the broadcast content setting information is selected, a sound and an image of the program are muted by the sound processing unit and the image processing unit, respectively, and impossibility of viewing the program is informed on the output unit.

3. The electronic equipment control system according to claim 2, wherein the specific piece of electric equipment is a portable terminal.

4. The electronic equipment control system according to claim 2, wherein the broadcast content setting information includes view limitation information for limiting view of a predetermined broadcast content.

5. The electronic equipment control system according to claim 3, wherein the broadcast content setting information includes view limitation information for limiting view of a predetermined broadcast content.

* * * * *